United States Patent [19]

Davies et al.

[11] Patent Number: 5,711,388

[45] Date of Patent: Jan. 27, 1998

[54] ROBOTIC GOLF CADDY APPARATUS AND METHOD

[75] Inventors: Ronald C. Davies, San Jose; Frederick J. Fowler, Fremont, both of Calif.

[73] Assignee: GolfPro International, Inc., Santa Clara, Calif.

[21] Appl. No.: 682,105

[22] Filed: Jul. 17, 1996

Related U.S. Application Data

[60] Provisional application No. 60/001,258, Jul. 20, 1995.
[51] Int. Cl.⁶ ........................................................ B62D 1/28
[52] U.S. Cl. .................. 180/168; 180/65.1; 280/DIG. 5; 901/1; 364/449
[58] Field of Search ........................... 180/65.1, 167, 180/168; 280/DIG. 5, DIG. 6; 364/424.02, 449, 460; 901/1

[56] References Cited

U.S. PATENT DOCUMENTS

| | | | |
|---|---|---|---|
| 3,812,929 | 5/1974 | Farque | 18/167 |
| 4,620,285 | 10/1986 | Perdue | 180/167 |
| 5,438,518 | 8/1995 | Bianco et al. | 364/460 |
| 5,524,081 | 6/1996 | Paul | 364/460 |
| 5,532,690 | 7/1996 | Hertel | 180/167 |
| 5,548,516 | 8/1996 | Gudat et al. | 364/443 |

*Primary Examiner*—Brian L. Johnson
*Assistant Examiner*—Avraham Lerner
*Attorney, Agent, or Firm*—Flehr Hohbach Test Albritton & Herbert LLP

[57] ABSTRACT

An autonomous personal service robotic apparatus, such as a robotic golf caddy, including a drive assembly for movement of the robotic caddy, a digital computer having memory devices in which are stored a digital map and navigation rules, and having a operations program for the control of performance of personal services, including movement and navigation of the caddy in the environment, and a position determination assembly for determining the position of the robotic device in the environment. The position determination assembly also dynamically determines the position of unmapped elements in the environment and super imposes or overlays them with the mapped elements and position of the robotic apparatus. Position preferably is determined by differential GPS techniques. The navigational rules for the robotic device control its movement in the environment in response to its sensed position in the mapped environment, the sensed unmapped elements and preferably the sensed relative position of the user. A method of providing an autonomous, personal services robot which is well suited to provide a robotic golf caddy.

42 Claims, 2 Drawing Sheets

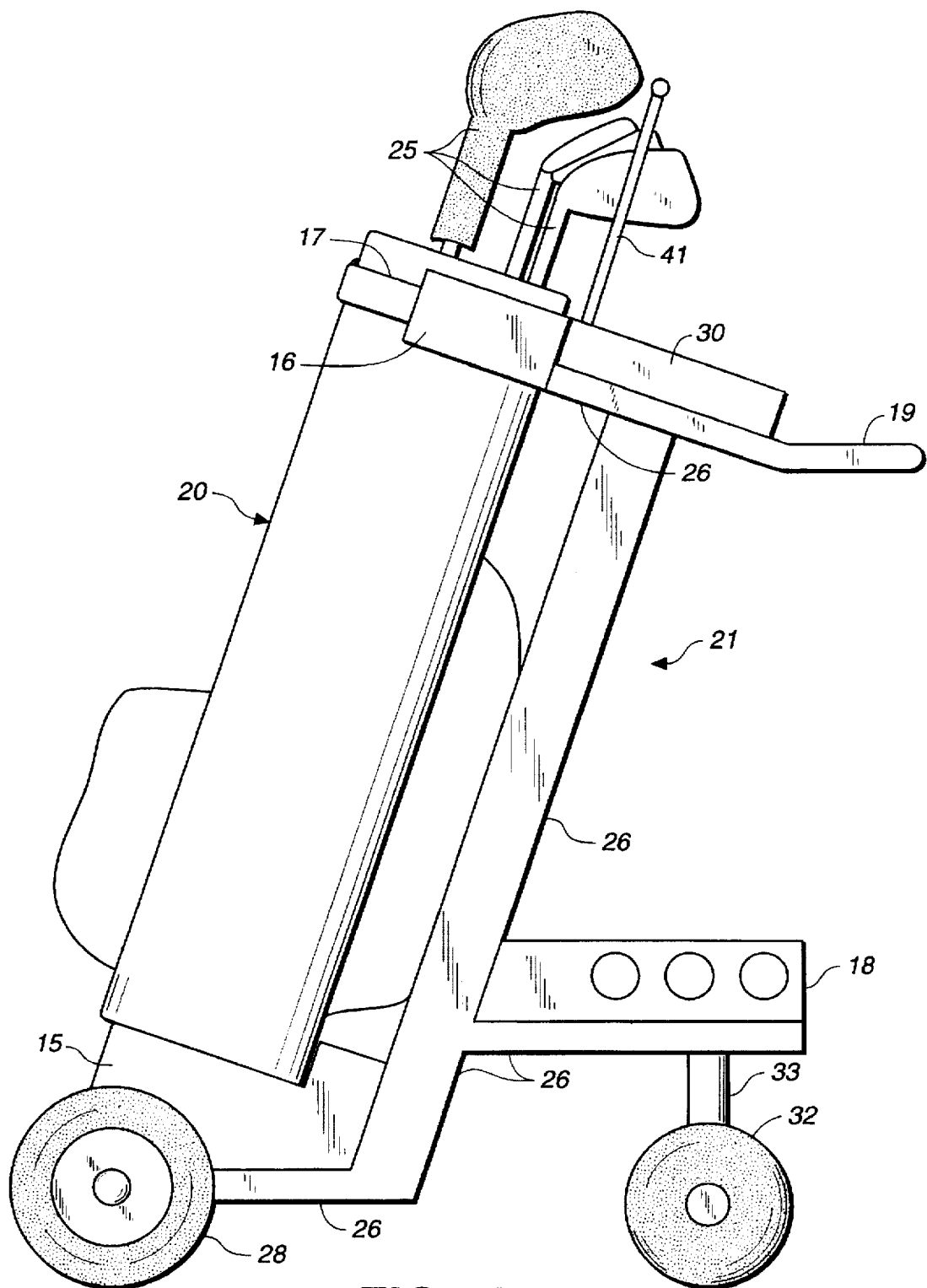
FIG._1

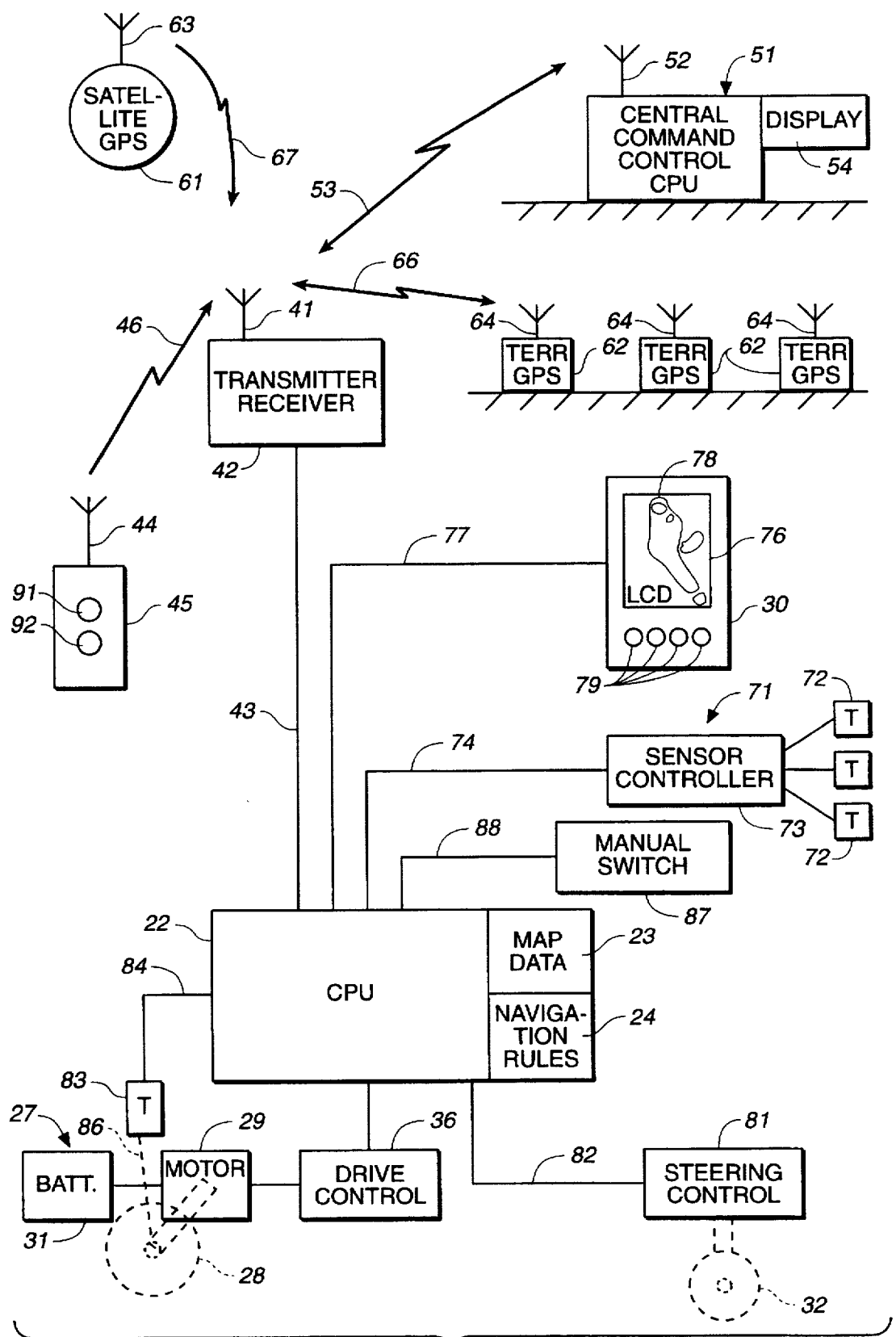
FIG._2

ROBOTIC GOLF CADDY APPARATUS AND METHOD

RELATED APPLICATION

This application claims the benefit of U.S. Provisional Application No. 60/001258, filed Jul. 20, 1995.

TECHNICAL FIELD

The present invention relates, in general, to computerized robotic devices, and more particularly, relates to an autonomous, robotic, walking golf caddy apparatus and method enabling navigation of a golf course in response to player movement and stored navigational and golf etiquette rules.

BACKGROUND ART

One of the great traditions of the game of golf is the freedom to walk the golf course. Thus, for many years golfers either carried their golf clubs or had a caddy carry their golf clubs as they walked the course. In addition to merely carrying the clubs, the caddy performed functions such as providing a golfer with course knowledge as to the distance and proper clubs to be used during play of the game.

In recent years, electric golf carts or cars have come into widespread use and economics have dictated that caddies are available only at the most exclusive golf courses. The electric, riding golf cars perform the function of carrying the clubs, as well as player, and sometimes more advanced riding golf cars include computerized maps of the golf course so that the golfer can see a representation of the hole and selected distances to the green.

Manual or walking pull carts for golf clubs also are in widespread use and can be owned by the golfer or are available at many golf courses on a rental basis. The economics of walking pull cart rentals versus that of electric riding cars is such that most golf courses encourage, or even require, that riding cars be used. The justification for requiring the use of riding golf cars often is to speed play, when, in fact, they are only marginally effective toward this end. More often it is the revenue stream that is the real driving force behind the requirement for use of riding golf cars.

To a limited degree, attempts have been made to motorize manual pull or walking golf carts. Usually, these electric walking carts take the form of a motorized platform which will carry the golf bag and clubs and will follow the golfer in response to what amounts to an electronic leash. The golfer carries a transmitter and the electric powered walking cart will follow the golfer as he walks the course. Another approach to electric walking carts has been to provide the golfer with a transmitter which includes a joystick so that the golfer can control motion of the cart remotely, rather than merely have the cart follow the golfer on the "leash." Both of these versions of electric powered walking golf carts, however, have no on-board intelligence. They are merely able to follow the golfer or allow the golfer to direct the path of the cart and very importantly still require the golfer to have total responsibility for their control.

Accordingly, it is an object of the present invention to provide a computerized, autonomous, robotic caddy which is capable of operation and decision making apart from the direct commands of the golfer so as to follow the golfer around the golf course carrying the clubs in a manner which emulates a human caddy.

Another object of the present invention is to provide a robotic, automated, golf caddy apparatus and method which can give the golfer information at any time as to the exact position of the golfer from any object on the golf hole being played and can provide advice to the golfer relative to his location on the course and skill level.

Still a further object of the present invention is to provide an autonomous, personal service robotic apparatus and method in which stored mapping, Global Position Sensing, and stored logic criteria or navigation rules are combined to enable autonomous decision making as to carrying out the various personal service robotic functions, such as caddying, which the robot is capable of performing.

Still a further object of the present invention is to provide an intelligent robotic golf caddy apparatus and method which obeys the rules of etiquette of golf and can carry golf clubs for one or more golfers in response to the golfer's movement on the golf course.

A further object of the present invention is to provide a robotic, golf caddy which can avoid all the hazards and obstructions on the golf course, regardless of their size and complexity, and will avoid moving and movable obstructions, including other carts or riding cars, golfers and the like, and is unobtrusive in its operation.

The present invention has other objects and features of advantage which will become apparent from, and are set forth in more detail in, the accompanying drawing and the following description of the Best Mode Of Carrying Out The Invention.

SUMMARY OF THE INVENTION

The autonomous, personal service, robotic apparatus of the present invention comprises, briefly, a drive assembly formed for unattended movement of the robotic apparatus in an environment; a digital computer having a memory storage device with stored map data as to the environment in which the robotic apparatus is to move, having a storage memory with stored navigational rules and having an operations program for control of the performance of personal services and for navigation; and a position determination assembly for determining the position of the robotic device in the environment. The position determination assembly is coupled to the computer, which in turn is coupled to the drive assembly. In the preferred form the position determination assembly enables sensing of the robotic apparatus' position, most preferably using differential GPS, relative to fixed elements mapped in the stored map data and further includes sensing apparatus which can dynamically sense unmapped environmental elements proximate the robotic apparatus. The computer overlays the dynamically sensed elements on the stored map data and the sensed position of the robotic apparatus in the environment to enable the computer to navigate movement of the robotic apparatus in accordance with the stored rules of navigation and the combination of mapped data and sensed data. Further, the preferred position determination assembly includes apparatus for sensing the location of a human, or a second robotic apparatus, in the environment, and the stored navigational data includes operational criteria which are dependent on the relative position between the robotic apparatus. In the most preferred form, the robotic apparatus is formed for carrying golf clubs and navigates a golf course in accordance with stored rules of golf etiquette.

In another aspect of the present invention, a method for providing an autonomous, personal services robot is set forth which comprises, briefly, the steps of storing environmental map data in a memory device for a computer; storing navigational rules for movement of the robot in the environment in the computer; sensing the position of the robot in the environment, preferably using terrain-based or satellite-based GPS; locating the robot relative to the stored map; dynamically sensing local unmapped elements in proximity to the robot, preferably with ultrasonic sensors; overlaying the dynamically sensed elements with the mapped environment; and moving the robot in the environment in accordance with the stored navigational rules, the sensed location, the stored map and the dynamically sensed elements. Additionally, the present method preferably includes the steps of dynamically locating the position of a human in the environment, and performing the moving step by further responding to the location of the human in the environment.

DESCRIPTION OF THE DRAWING

FIG. 1 is a schematic side elevation view of an autonomous robotic walking golf caddy constructed in accordance with the present invention.

FIG. 2 is a block diagram of the major components of the robotic golf caddy of FIG. 1.

BEST MODE OF CARRYING OUT THE INVENTION

The robotic apparatus and method of the present invention are not designed merely to carry out rote behavior, nor are they merely directed to move a golf cart by human input through a joystick controller or the like. Instead, the present robotic apparatus and method provide an autonomous robotic caddy that is capable of operating on its own and interacts with a human in accordance with stored rules of navigation and conduct. The present robotic apparatus and method includes a stored map, communication apparatus for sensing the robot's position on the map, localized sensors for dynamic location of unmapped and/or moving objects, and a communication device for determining the location of the human relative to the robot. This information is then integrated with stored behavior rules in order to govern the conduct of the robot in the environment relative to the human and in response to the human's movement or conduct in the environment.

In the preferred form, the robotic apparatus and method of the present invention are applied to implementation of an autonomous, robotic, electric, golf caddy. It will be understood, however, that many of the principles which are described in detail in connection with the electric, golf caddy can be applied with equal force to a wide variety of other robotic applications. For example, the system of the present invention could be used to drive a riding golf car, or it could be used to control mowing of the golf course at night by robotic mowing apparatus, or it could be used in robotic agricultural planting, fertilizing or harvesting applications, to name only a few applications.

Referring now the drawing, FIG. 1 shows a personal service robotic caddy apparatus, generally designated 21. Mounted on robotic caddy 21 is a golf bag 20 having a plurality of clubs 25 stored therein. Robotic caddy apparatus 21 includes a frame 26 on which a base housing 15 is supported. Bag 20 rests on housing 15 and is encircled proximate an upper end by movable arms 16 and a releasable securement strap 17, as is conventional for pull carts. Caddy 21 of the present invention advantageously is designed to support two side-by-side bags, and arms 16 are displaceable to substantially grip or engage one or two golf bags.

Rotatably supported from frame 26 is at least one, and preferably a pair, of drive wheels 28, while at least one, and preferably a pair, of stabilizing front caster wheels 32 are also supported from frame 26. Wheels 32 are mounted to vertically extending post 33.

Robotic caddy 21 also can be seen in FIG. 1 to have a housing 18 which houses dynamic sensing apparatus, as described below, a power-assisted manual operation handle 19, and a display housing 30. Finally, mounted proximate an upper end of frame 26 are a plurality of communications antennas 41, 41a and 41b.

Now, referring to FIG. 2, the basic components which control operation of robotic golf caddy 21 are shown in a block diagram. At the heart of the present apparatus is a general purpose computer, 22, preferably a digital computer having a central processing unit (CPU) which can take the form of a 486 chip, Pentium or other CPU of similar processing capacity. Obviously, less powerful processors could be used with some decrease in operational speed. Moreover, as described below, several other computer processors are used to control drive functions, communications functions and dynamic sensing functions to augment the central control computer 22. Computer 22 will have integral or associated memory storage devices, such as map data memory device 23 and navigation or golf etiquette storage memory device 24. CPU 22 can be positioned in housing 15 or housing 18 on framework 26.

Typically, robotic caddy 21 will include an electric drive assembly 27, although an internal combustion engine also could power the robot. Drive wheels 28 are driven by electric motor 29 that, in turn, is coupled to rechargeable storage batteries 31. A motor controller or microprocessor 36 interfaces between computer 22 and motor 29 to enable control of the operation of the motor by the computer. The control functions of controller 36 obviously could also be integrated into computer 22 if sufficient capacity was provided. Drive wheels 28 can be operated at differing relative speeds to effect steering, and accordingly controller 36 also functions as a steering device.

The electric, golf caddy 21 of the present invention preferably includes an array of position determination apparatus which allow the robotic caddy to be oriented in its operating environment with respect to mapped major boundaries and elements. The position determination apparatus of the present robot also includes apparatus for sensing the presence of unmapped, terrain-based obstacles, as well as moving obstacles in the environment. Moreover, the position determination apparatus of robotic caddy assembly 21 of the present invention preferably further includes apparatus for continuously monitoring the location of a human user so that response of robotic caddy apparatus 21 can be controlled by a combination of the position of the robotic caddy in its operating environment, as well as the position of the human user. In applications which there is no human user, determination of the position of the human user can be eliminated, or the response can be dependent upon the position of another robotic apparatus.

Carried by personal service robot 21 is a communication antenna 41b designed to receive Global Positioning System (GPS) signals. Antenna 41b is coupled to a GPS receiver 42, which is preferably a 6 or 8 channel receiver capable of receiving signals from 6 or 8 satellites 61 at any time to enable location by triangulation. A telecommunications signal processor is coupled to receiver 42 and further is connected by electrical conductors 43 to computer 22. The telecommunications signal processor is adapted for receipt of the communication signals from either terrain-based or satellite-based transmitters.

Satellite-based transmitter 61 is preferred and includes an antenna 63. Transmitter 61 may be provided by the NAVSTAR group of satellites that circle the earth and permit earth-based receivers to triangulate the longitude, latitude and elevation of earth-based receivers. There are currently 21 of such satellites in orbit which are now being used for many applications in what is well known as "Global Positioning System" (GPS).

Since GPS sensing is typically only accurate to 10 to 30 meters, the telecommunication sensing preferably employed by robotic caddy 21 is differential GPS. Differential GPS is accomplished by constant receipt of a plurality (6 or 8) of the satellite transmitter signals by a command control station 51. Command control station 51 is at a fixed and known location, and, accordingly, command station 51 can determine its own location from the plurality of satellite transmitters 61 and compare the location determined by GPS from the satellite transmitters with the actual known location of the command station. This creates an offset or differential that, in turn, can be used to correct the GPS position which the moving robotic caddy 21 is perceived to be located as a result of GPS communications from transmitters 61.

While conventional direct GPS positioning will enable location of robotic caddy 21 at a position plus or minus 10 to 30 meters, differential GPS allows caddy position to be located plus or minus one meter, or less. Thus, by correcting the error of GPS positioning of the fixed command station, the command station, in turn, can make a correction or offset for the robotic device by signal 53 transmitted to robotic device communications antenna 41 indicating that each of the GPS positions determined by the caddy directly from the satellites should be corrected by a certain amount. The correction or differential amount can be provided on the order of once per second so that at any time the position of robotic caddy 21 has the error inherent in the GPS system removed. This allows location of robotic caddy 21 relative to the stored digital map in memory 23 to a position which is correct to within about one cubic meter.

In many golf course installations, a single central command transmitter antenna 52 can transmit the differential correction to communications antenna 41 by signal 53 directly for all positions on the golf course. In some locations, however, the terrain will not permit direct communication and repeater transmitters can be stationed around the golf course at strategic locations so that all positions on the course will be able to receive a signal, either directly from central command station 51 or through the repeater stations. As shown in FIG. 2, therefore, transmitters 62 with antenna 64 can be regarded as repeater stations which receive differential or correction signals 53 from station 51 and then rebroadcast them as signals 66, which are received at antenna 41 and are used in combination with the signals 67 received by antenna 41 directly from satellites 61 so as to produce a differential GPS location of much greater accuracy than would be otherwise possible.

It is also possible to use terrain-based transmitters 62, with antenna 64, to locate robotic caddy 21. Terrain-based GPS positioning has thus far not been as cost effective or reliable as differential satellite-based GPS for golf caddy applications. It will be understood, however, that in other applications such terrain-based GPS may have advantages.

In applications in which there is a human user (or other robotic device) with which robot 21 must interact, a set of receivers and a beacon locator signal processor within transmitter 42 are adapted to receive signals from a transmitter 45, such as a radio frequency transmitter beacon carried by the golfer, and communicate processed signals to computer 22 through conductor line 43.

In order to determine the bearing and distance of the golfer's beacon or transmitter 45 from robotic caddy 21, it is preferable that a triangular array of receiving antenna 41 be employed. Although in FIGS. 1 and 2, the antenna 41 is shown only in two dimensions, it will be understood that they should take the form of an equilateral triangle, and they can be mounted at other locations and are only schematically shown in FIG. 1.

The locator processor of transmitter receiver 42 processes beacon signal 46 from transmitter 45 as received by. The locator processor uses the phase relationship of receipt at the antenna to determine the bearing and the amplitude of the respective signals together with timing of their receipt to determine the range. The navigational rules stored in memory device 24 do not require that extreme precision be achieved in location of the golfer with respect to the robotic caddy.

It is sufficient if the robotic caddy can determine which general mapping zones the golfer is in and the golfer's approximate location so that the caddy can move to a position proximate the golfer or to parking areas, as described below.

As above described, telecommunication signals to robotic device 21 also travel to and from central command or control station 51. In addition to obtaining the differential correction from command station 51, caddy 21 can transmit an identified location signal back to the command station by transmitter receiver 42 so that the position of each robotic caddy will be known at the central control station. The central command and control station preferably further includes a display device 54 to enable display of caddy locations, and the central station preferably is implemented by a general purpose digital computer electrically coupled to display device 54.

In the most preferred form, central control station 51 also has the ability to change stored mapping data and/or navigational rules. Thus, if an area of the golf course is being reseeded, for example, the stored data in memory 23 can be altered to make this area of the course one in which caddy 21 cannot travel.

The robotic caddy device of the present invention further includes a plurality of localized sensors for dynamic sensing of moving and/or unmapped objects or elements, such as an ultrasonic sensor assembly 71, which includes a plurality of transducers 72 that are coupled to sensing signal processor 73. Signal processor 73, in turn, is coupled at 74 to computer 22 on the robotic device so that dynamically sensed objects in proximity to the robot, which would pose hazards or barriers to the motion of the robot, can be communicated to computer 22. Thus, stationary objects such as trees, bushes, benches, poles, fences and the like, which protrude and are fixed, can be sensed by sensors 71. These objects are too frequent and/or small to be mapped and stored in memory 23. Moreover, sensors 72 allow sensing of movable objects, such as other golfers, riding cars, benches and similar structures which can be periodically moved or changed in their position constantly and, therefore, cannot be mapped.

In order to serve as a base for navigation of robot 21 in its operational environment, as alluded to above, robotic caddy device 21 of the present invention includes data capable of providing a map of the environment. This map data can be stored in storage device 23. The map data can be generated in a number of manners. One approach is to take a digitally-enhanced orthophotos of the golf course layout. Precise coordinates can then be established for various prominent features of the terrain by riding the golf course in a holeby-hole survey and indicating prominent points as XY boundaries which are converted into a digital map and stored in memory 23.

Additionally, the robotic apparatus of the present invention is provided with stored rules or logic criteria for navigation and/or golf etiquette for operation of the robotic device. In memory device 24, therefore, both navigational rules and golf etiquette rules for operation of robotic device 21 can be stored. For example, in terms of golf etiquette, the robotic device can be programmed to follow the golfer between the tee and the green at a predetermined and/or selected distance behind the golfer. When the golfer stops, the robotic caddy will also stop. When the golfer goes into a hazard such as a sandtrap or barranca, the robotic caddy can wait at the edge of the hazard until the golfer returns to the fairway. When the golfer goes onto the green, the robotic caddy can move to a holding position proximate the next tee and terminate all motion while the golfer is putting.

Navigational rules can include rules which prohibit the robotic device from entering areas, such as tee boxes, hazards, greens, sandtraps and the like. The rules can also include the general rule of tracking the golfer at a minimum tracking distance behind the golfer, and approaching and stopping closely proximate the golfer when summoned to the golfer by the golfer's transmitter 45, in a manner described below, and parking or not moving if the golfer approaches the robotic caddy. The navigational rules would also include avoidance movement around unmapped but dynamically sensed, obstacles while trying to follow movement of the golfer from tee to green.

In order to provide additional functions typical of a caddy, robotic golf apparatus 21 of the present invention preferably also includes a graphic display device 76, which can be located conveniently in housing 30, and which can take the form of a liquid crystal display. Display device 76 is coupled through signal communication conductor or line 77 to computer 22 so that display of a particular hole 78 and the distances between the caddy's current position and various features of the golf hole, can be displayed. For example, the distance between the current robot position and the front, middle and back of the green can be selectively or simultaneously displayed by input to display buttons 79. As the position of the robotic device is shifted on a hole, the various distances are decremented automatically by computer 22 and can be displayed as demanded by the player.

Similarly, since caddy 21 constantly determines its exact position on the stored map, it is possible to store "relative caddy advice" in a memory device associated with computer 22. Thus, advice to a golfer which is recalled when the caddy is at a particular location on a hole can be displayed along with distance. It also is possible to make transmitter 45, or another input device, able to input information concerning the golfer, e.g., the golfer's handicap or skill level, and have the relative caddy information vary as a function of the golfer's skill. When the lay-up short of to green, which way the green brakes, etc. can all be stored and displayed. Ultimately, a golfer's history on a particular course on a hole-by-hole basis could be read in and recorded back out onto a golfer's individualized input card for more sophisticated relative caddy tips.

In order to provide additional information as to the position of robotic device 21 an odometer or mileage transducer 83 can be coupled at 84 for input to computer 22 and coupled mechanically at 86 to one of the wheels on the cart, for example, your rear drive wheels 28. Similarly a compass, not shown, can be coupled to input computer 22. Odometer 83 and the compass, however, need not be precisely accurate in light of possible wheel slippage during operation and the presence of ferromagnetic bodies on the course, but they can, nevertheless, provide information as to instantaneous positions that can be overlayed on the environment map stored in storage device 23 so as to determine changes in the robotic caddy's position.

Finally, a manual controller 87 can be provided at handle 19 and coupled to the computer through conductor line 88 so as to enable override of the powered automatic navigation of the robotic device. Thus, when the golfer decides to pull robotic assembly 21 as a matter of convenience and/or safety, controller 87 allows the automatic navigation functions to be overridden and yet the golfer still obtains power-assisted operation from drive assembly 27. Handle 19 is provided with a strain gauge assembly in which transducers are physically located in handle 19 so as to sense pulling, pushing and right and left hand pressure for steering. As an example, the golfer may want to manually guide caddy 21 in a parking lot environment. The robotic caddy will "see" automobiles and other golfers in the parking lot, but there is some danger that the drivers of the automobiles will not see or predict the movement of the robotic caddy. Manual operation of the caddy under such conditions insures that automobiles will not be driven into the robotic device.

Obviously, computer 22 also has to have a program for execution of commands and integration and overlay of the map data, navigational rules, dynamically sensed data, and telecommunications input. Such an operations program can take several forms and suitable programming of this type is well known to those skilled in the art once the desired functions and criteria for operation are selected.

In order to assist in navigation, the digital map stored in storage device 23 advantageously can include a plurality of differing zones with identifying navigational codes or numbers. A No. 1 zone, for example, might comprise an area which the robotic caddy cannot enter in the map on its own under any conditions. Thus, barrancas, lakes, sandtraps, greens and tee boxes might all be zone 1 areas on the digitized stored map. A zone 2 area might be areas in which the robotic device is free to enter and navigate automatically in accordance with its stored rules of navigation. Examples might include fairways and pathways between greens and the tees. A zone 3 area might be a holding or parking position, such as an area proximate the tee to which the robotic device proceeds and parks when the golfer enters the area of the green. Other zone 3 areas might be battery charging areas proximate the clubhouse and caddy parking areas at the clubhouse proximate the first tee for loading of clubs onto the robotic caddy. A zone 4 area might be the parking lot in which only manual operation is possible.

In any event, the digitized map will define areas in which navigation is possible or prohibited or subject to special rules, such as parking, as such areas are identified by coded zone designations.

In the preferred implementation of the invention, at the start of each day, the central command or control station 51 will activate each of the robotic devices and cause them to move from charging stalls or racks to a parking area proximate the first tee so that golfers can load their equipment onto the robotic caddies. Each robotic device will carry with it at least one golfer's transmitter or beacon 45 so that when the clubs are mounted on caddy frame 26, the golfer can also pick up control transmitter or beacon 45.

Typically, transmitter 45 can operate in the 900 MHz range and have two command switches 91 and 92 which allow the golfer to call or summon the robotic device and release it to another golfer using the same robotic caddy 21. Accordingly, in the preferred form, each robotic device 21 will be equipped with two golfer beacons or transmitters 45, each of which can call and release the caddy so that it can service two golfers. The transmitter 45 will have a fixed coded signal 46 identifying the transmitter, preferably is rechargeable, and will transmit the coded signal four or five times per second for a two millisecond duration. The range of transmitter 45 can be comparatively short.

After loading their clubs and placing transmitters 45 on their belts, in a harness or in a pocket, the golfers can proceed to the first tee and summons robotic caddy 21 to the tee. The caddy will then automatically proceed from the holding or clubhouse parking space proximate the first tee to a parking space at the first tee so the golfers are able to make a club selection. As long as the robotic caddy senses the location of the golfer in the tee box area on the digital map, the robotic caddy will remain parked proximate the tee box in a parking zone. Thus the robotic caddy will not shift or otherwise be distracting or disruptive during the process of the golfer hitting the first shot.

Once the golfers have teed off, they can either return the club to the caddy or carry the club and begin walking down the fairway toward their ball. Once the caddy sees that the transmitter 45 controlling the caddy has left the tee box zone and started down the fairway, the stored navigational rules will command the robotic device to follow the golfer currently controlling the robotic caddy down the fairway. Initially, there typically will be pathways from the tee box to the fairway within which robotic device 21 will be constrained to advance. As the robotic device leaves the tee box on the pathways, it will begin to track the golfer and map the shortest route possible to follow the golfer at a preset, or adjustable, distance behind the golfer.

While in the various parking positions, for example, proximate the first tee box, transmitter receiver 41b on the robotic caddy will also receive signals 67 from satellite transmitter 61 and receive differential signals 53 from control station 51 to determine the position of robotic caddy 21 within one meter on the stored digital map. Thus, the robotic caddy confirms that it is in the proper parking area. Moreover, the position sensing ultrasonic transducers 72 will be looking for and sensing unmapped objects proximate the parking area and the tee. As the golfers leave the tee and start down the pathway, therefore, their presence in proximity to ultrasonic sensors 72 will be detected and navigational rules in storage device 24 will inhibit or prevent advancement of the robotic device into the golfers as they are leaving the tee. Similarly, sensors 72 will prevent the caddy from advancing into a bench which has been moved into a position that partially obstructs the tee parking area or the path from the tee to the fairway.

Thus, it is an important feature of the present invention that the stored digital map generated in CPU from data in memory 23 is overlayed by a dynamic sensing of localized and unmapped objects, either fixed or moving, which allows the computer to determine the best path for the robotic device to follow the golfer off the tee and down the fairway, in light of the sensed presence of unmapped objects or elements. If, for some unforeseen reason, a bench or other obstruction is positioned entirely across the only permitted path for the robotic device, robotic caddy 21 will stop, and the golfer will simply grab handle 19 and manually navigate the cart around the object until the cart is again in a zone of the map in which automated navigation is permitted. The constant ranging by dynamic sensor assembly 71 preferably is accomplished through ultrasonic transducers, but it will be understood that other ranging apparatus can be employed.

Once on the fairway, the golfer proceeds to his ball and robotic caddy apparatus 21 automatically maps a path to follow the golfer at a distance. When the golfer reaches his ball, the caddy will see that the golfer has stopped and stop at a spaced distance from the golfer. The robotic caddy can then be programmed to remain parked while the golfer approaches the robotic caddy, or the robotic caddy can be summoned to the golfer from its spaced distance from the caddy to a very close position to enable club selection. As part of the club selection, the golfer can input display apparatus 76 so as to determine the distance from the current caddy location to various features on the hole being played and obtain any relative caddy tips which may be available for that location. The robotic caddy will then, under its rules or logic criteria for navigation, remain still while the golfer is within a certain radius of the caddy so that the golfer can hit the next shot without caddy motion and can return the club to the robotic caddy. If the golfer is playing alone, once he proceeds out of the fixed radius, the robotic device will again sense advancement of the golfer and begin plotting a tracking course to track the golfer down the fairway. If playing with another golfer, the first golfer can then release the caddy to the second golfer, who can summon the caddy to the second golfer's position for selection of a club.

If the golfer should hit his ball into a hazard, which is in an zone identified so that the robotic caddy cannot enter, the robotic caddy will follow the golfer to the edge of the zone where the golfer entered and parked. The golfer will then have to leave the hazard to select a club and will not be able to summon the robotic caddy into the hazard. The robotic caddy preferably does not follow the golfer as he or she moves in the hazard so that caddy motion does not disrupt other golfers. Once the robotic caddy senses that the golfer has left the hazard, however, it resumes tracking of the golfer.

As the golfer proceeds to the green, the robotic caddy will follow the golfer up to an area around the fringe of the green. Typically, many golf courses will have sandtraps proximate the green. The caddy will wait at the fringe of the green if it detects that the golfer has advanced into a sandtrap zone or is on the fringe, but not yet on the green. This will allow the golfer to hit a sand wedge or pitching wedge, return to the caddy and replace the sand wedge with a putter. Once the golfer walks onto the green, however, the caddy will be programmed to depart the green fringe and move to a tee parking area or zone proximate the next tee. At the tee parking area, the robotic caddy will cease all motion so as not to disrupt the golfer while putting.

At each shot, the caddy can be released by one golfer to the other so that the clubs of two golfers can be carried by a single caddy.

The robotic caddy will continue to monitor the position of the golfer as he leaves the green zone and approaches the tee box zone. The caddy will remain parked, however, until it senses that the golfer has proceeded down the next fairway, indicating that the tee shot has been made. The process of navigation then repeats itself from hole to hole. During the entire process, robotic caddy 21 is determining its position from transmitters 61 and central station 51, using spread spectrum, radio-based network communications technology and differential GPS.

The method of providing an autonomous personal services robot of the present invention can be seen from the above description to include the steps of storing environmental map data in a memory device of a computer, storing navigational rules for movement of the robotic caddy in the environment in a memory device, sensing the position of the robotic caddy in the environment, locating or correlating the position to the stored map, dynamically sensing local unmapped elements in the environment in proximity to the robotic caddy, overlaying the dynamically sensed elements with the mapped environment, and moving or driving the robotic caddy in the environment in accordance with the stored navigational rules, the sensed location of the robotic caddy in the environment and the dynamically sensed unmapped elements of the environment. Additionally, the present method preferably includes the step of dynamically locating the position of the user relative to the position of the robotic caddy and further applying navigational rules to the movement of the robotic caddy in response to the position of the human in the environment.

What is claimed is:

1. An autonomous robotic apparatus comprising:
  a powered movable frame assembly;
  a computer control assembly carried by said frame assembly and coupled to control movement of said frame assembly, said computer control assembly having a map of an environment in which said robotic apparatus is to move stored therein and having navigational rules stored therein;
  a communications assembly carried by said frame assembly and coupled to communicate signals to said computer control assembly, said communications assembly being formed to sense the position of said robotic apparatus in said environment using differential GPS signals from a combination of GPS satellites and a fixed ground station and being formed to communicate resulting robot position signals to said computer control apparatus, and said communications assembly being further formed to sense communication signals from at least one golfer and being responsive thereto to communicate golfer position signals to said computer control assembly; and
  said computer control apparatus being responsive to said robot position signals and to said golfer position signals to employ said map and said navigational rules to control movement of said robotic apparatus in said environment as a function of the sensed position of said robotic apparatus and said golfer in said environment.

2. The robotic apparatus as defined in claim 1 wherein, said frame assembly is adapted to carry at least one set of golf clubs to provide a golf caddy apparatus; and
  said map of said environment is a digitized map of a golf course.

3. The robotic apparatus as defined in claim 1 wherein, said communication signals from a movable local transmitter and in response thereto to communicate local transmitter position signals to said computer control assembly; and
  said computer control assembly is further responsive to said local transmitter position signals to control movement of said robotic apparatus in said environment.

4. The robotic apparatus as defined in claim 1, and further comprising a signal transmitter adapted to be carried by a golfer and transmit a signal to be received by said communications assembly.

5. An autonomous, robotic, golf caddy apparatus comprising:
  a frame formed to carry a set of golf clubs thereon;
  a wheel assembly rotatably mounted to said frame for rolling support of said frame over a golf course;
  a drive assembly carried by said frame and coupled to drive said wheel assembly, said drive assembly including a source of power;
  a computer assembly carried by said frame and including a memory device, said computer assembly being coupled to control operation of said drive assembly;
  map data comprising a map of said golf course stored in said memory device;
  rules data comprising a set of operational rules for caddying on said golf course stored in said memory device;
  a communications apparatus carried by said frame and formed to receive communication signals from a remote caddy position determining transmitter and responsive to said communication signals to generate a caddy position signal, said communication apparatus being coupled to communicate caddy position signals to said computer assembly;
  an operations program stored in said computer and responsive to receipt of position signals to determine the location of said caddy apparatus on said golf course using said map data, and said operations program further being responsive to the determined location of said caddy apparatus to control movement of said caddy apparatus over said golf course using said rules data;
  said communications apparatus is further formed for receipt of communication signals from a transmitter carried by a golfer and is responsive thereto to generate a golfer position signal, said communication apparatus is further coupled for communication of said golfer position signal to said computer assembly; and
  said operations program is further responsive to receipt of golfer position signals by said computer assembly to determine the location of said golfer on said golf course using said map data, and said operations program is further responsive to the determined locations of both said golfer and said caddy apparatus to control movement of said caddy apparatus over said golf course using said rules data.

6. The golf caddy apparatus as defined in claim 5 wherein, said communications apparatus is formed to receive a plurality of GPS communication signals from Global Positioning System satellites and is responsive thereto to determine the location of said caddy apparatus on said golf course.

7. The golf caddy apparatus as defined in claim 6 wherein, said communication apparatus is formed to receive communication signals from a fixed terrestrial base station for differential GPS position location and is responsive to a combination of said GPS communication signals and communication signals from said base station to determine the location of said caddy apparatus on said golf course.

8. The golf caddy apparatus as defined in claim 7 wherein, said communication apparatus is formed to receive at least one GPS communication signal per second and to respond thereto to produce at least one caddy position signal per second; and
  said operations program is responsive to at least one caddy position signal per second and at least one golfer position signal per second to determine the locations of said caddy apparatus and said golfer on said golf course at least once per second and to compute a best path of movement of said caddy apparatus using the determined locations and said map data and said rules data at least once per second.

9. The golf caddy apparatus as defined in claim 7 wherein, said operations program determines the location of said golfer from said golfer position signal by first determining the location of said caddy apparatus from said caddy position signal and thereafter determining the location of said golfer relative to the location of said caddy apparatus.

10. The golf caddy apparatus as defined in claim 7 wherein, said communication apparatus is formed to receive low power, spread spectrum, encoded, radio frequency communication signals from a golfer-carried transmitter.

11. The golf caddy apparatus as defined in claim 5 wherein, said communications apparatus is formed to receive golfer communication signals from two golfers and to respond thereto to produce a golfer position signal for each golfer.

12. The golf caddy apparatus as defined in claim 11 wherein, said frame is formed to carry two sets of golf clubs.

13. The golf caddy apparatus as defined in claim 11 wherein, said communications apparatus is formed to receive selection signals from said golfers indicating which of said two golfers said caddy apparatus should follow and is responsive to said selection signals to communicate a follow signal to said computer apparatus; and said operations program is responsive to receipt of said follow signal to control operation of said caddy apparatus based upon golfer position signals from the golfer indicated by said follow signal to be followed.

14. The golf caddy apparatus as defined in claim 5 wherein, said source of power is at least one rechargeable battery and said drive assembly includes an electric motor.

15. The golf caddy apparatus as defined in claim 5 wherein, said map data is provided as a digitized map based upon an aerial photograph of said golf course.

16. The golf caddy apparatus as defined in claim 5 wherein, said map data includes areas into which movement of said caddy apparatus is prohibited.

17. The golf caddy apparatus as defined in claim 5 wherein, said map data includes areas in which the rate of movement of said caddy apparatus is limited.

18. The golf caddy apparatus as defined in claim 5 wherein, said map data includes areas of hazards, greens, tees and cart paths.

19. The golf caddy apparatus as defined in claim 5 wherein, said rules data includes rules of navigation of said caddy apparatus based upon rules of golf etiquette.

20. The golf caddy apparatus as defined in claim 5, and local sensor apparatus carried by said frame and formed to sense the presence of movable and unmapped objects in proximity of said caddy apparatus, said local sensor being coupled to communicate unmapped object signals to said computer assembly indicating the location of sensed unmapped objects relative to said caddy apparatus; and said operations program being formed to be response to said unmapped object signals in combination with position signals, rules data and map data to control movement of said caddy apparatus.

21. The golf caddy apparatus as defined in claim 20 wherein, said local sensor apparatus is comprised of sonar sensor apparatus coupled to said computer assembly.

22. The golf caddy apparatus as defined in claim 21 wherein, said sonar sensor apparatus is provided by a plurality of sonar sensors arranged in an array oriented to sense unmapped objects in front of and along each side of said caddy apparatus.

23. The golf caddy apparatus as defined in claim 5, and display apparatus carried by said frame and coupled to said computer assembly, said computer assembly being formed to retrieve said map data and display images of said golf course as determined by the location of said caddy apparatus on said golf course.

24. The golf caddy apparatus as defined in claim 23 wherein, said computer apparatus further displays distance indicia on said display apparatus indicating the distance of said caddy apparatus from selected features on said golf course.

25. The golf caddy apparatus as defined in claim 5, and advice data correlated to positions on said golf course and stored in said memory device, said computer apparatus further including an output device for communication of advice to the golfer; and said operations program further being responsive to determination of the location of said caddy apparatus to make advice available to the golfer through said output device.

26. The golf caddy apparatus as defined in claim 25 wherein, said output device is provided by a display screen carried by said frame and coupled by said computer apparatus.

27. The golf caddy apparatus as defined in claim 25, and an input device formed to communicate input signals to said computer assembly identifying the identity of the golfer using said caddy apparatus and data as to at least one of the golfer's handicap and past rounds of golf played on said golf course; and wherein said memory device stores said input signals and said operations program is responsive to provide advice for the golfer through said output device based upon identity input signals and upon the location of said caddy apparatus on said golf course.

28. The apparatus as defined in claim 27 wherein, said computer apparatus is further provided with an output device formed for output to a storage device carried by said golfer of past performance of said golfer stored in said memory device.

29. An autonomous robotic caddy apparatus comprising:

a powered rolling caddy frame assembly adapted to carry at least one golf bag, a computer control assembly carried by said frame assembly and coupled to control powered movement of said frame assembly, and communications assembly carried by said frame assembly and coupled to said computer control assembly, said communications assembly being formed to determine the position of said caddy apparatus using differential GPS signals, and said computer control assembly having a stored golf course map and stored navigational rules therein, said computer control assembly being responsive to signals from said communications assembly to control of the movement of said caddy apparatus at least in part based upon the position of said caddy apparatus on said golf course and said navigational rules wherein, said communications assembly is further formed to receive position signals from a golfer transmitter and is adapted to determine the position of a golfer therefrom; and said navigational rules in said computer control assembly further control movement of said caddy apparatus at least in part based upon the position of said golfer.

30. The autonomous robotic caddy as defined in claim 29 wherein, said caddy frame further carries a sonar sensor assembly formed to sense the position of unmapped objects proximate said caddy apparatus and coupled to said computer control assembly; and said navigational rules in said computer control assembly further control movement of said caddy apparatus at least in part based upon sensed unmapped objects proximate said caddy apparatus.

31. The autonomous robotic caddy as defined in claim 30, and at least one golfer position transmitter having a size suitable for carrying by a golfer; and at least one fixed location differential GPS signal transmitter station proximate said golf course and adapted to transmit differential GPS signals to said caddy apparatus while on said golf course.

32. A robotic caddy system for a golf course comprising:

(a) a plurality of powered robotic caddy apparatus each carrying and controlled by a central processing unit and a communications assembly, each said central processing unit having a navigational program therein adapted to control movement of each caddy apparatus based upon a combination of differential GPS signals and golfer position signals received by said communication assembly, a map of said golf course, and rules of movement stored in said central processing unit;

(b) a fixed differential GPS station positioned proximate said golf course and formed to receive GPS signals from satellites and transmit differential GPS signals to said caddy apparatus while on said golf course; and (c) at least one golfer position transmitting beacon for each caddy apparatus and having a size suitable for carrying by a golfer.

33. The robotic caddy system as defined in claim 32 and a plurality of repeater stations positioned around said golf course and formed to receive said differential GPS signals from said fixed differential GPS station and to rebroadcast said differential GPS signals to said caddy apparatus.

34. The robotic caddy system as defined in claim 32 wherein, said communication assembly on each caddy apparatus is formed to transmit signals to said fixed differential GPS station to communicate the location of said caddy apparatus to said fixed differential GPS station.

35. The robotic caddy system as defined in claim 32 wherein, each of said caddy apparatus is adapted to repetitively determine its own caddy location on the golf course, the golfer's location on the golf course, and a best path of movement based upon said caddy location, said golfer's location and said rules of movement.

36. The robotic caddy system as defined in claim 35 wherein, each caddy apparatus further has a local sensor assembly for determination of the location of unmapped objects in proximity to said caddy apparatus.

37. The robotic caddy system as defined in claim 36 wherein, each caddy apparatus repetitively determines a best path of movement based after determining the location of unmapped objects in proximity to said caddy apparatus.

38. A method of controlling the movement of a robotic golf caddy apparatus over a golf course comprising the steps of:

receiving GPS positioning signals at a powered autonomous robotic caddy apparatus having a GPS signal receiver and a computer control assembly with data comprising a map of said golf course and location-based navigational rules stored therein;

receiving a golfer position signal at said caddy apparatus; and moving said caddy apparatus under control of said computer control assembly based upon determination of the locations of said caddy apparatus and said golfer on said golf course from the received signals and applying said navigational rules as a function of the determined locations.

39. The method as defined in claim 38 wherein, said moving step is accomplished by calculating a best path of movement based upon said locations and said navigational rules; and said calculating step is repeated as said caddy apparatus is moving to provide a new best path of movement.

40. The method as defined in claim 38 and the step of:

sensing the presence of objects in proximity of said caddy apparatus by a sensor assembly carried thereby and coupled to said computer control assembly; and performing said moving step by applying said navigational rules after said sensing step and while considering sensed objects.

41. The method as defined in claim 38 wherein, said step of receiving a golfer position at said caddy apparatus is accomplished by receiving two golfer position signals to said caddy apparatus and receiving a selection signal at said caddy apparatus; and said moving step is accomplished by applying said navigational based upon only one of said golfer position signal as determined by said selection signal.

42. The method as defined in claim 38 wherein, said receiving step is accomplished by receiving GPS signals from a plurality of satellites and receiving a GPS connection signal from a fixed ground station to determine said location of said caddy apparatus.

* * * * *